UNITED STATES PATENT OFFICE.

HERBERT N. McCOY, OF CHICAGO, ILLINOIS.

METHOD OF TREATING RADIO-ACTIVE BARIUM COMPOUNDS.

1,103,600.        Specification of Letters Patent.        Patented July 14, 1914.

No Drawing.        Application filed March 27, 1914. Serial No. 827,667.

*To all whom it may concern:*

Be it known that I, HERBERT N. McCOY, a citizen of the United States, residing at Chicago, in the county of Cook and State of Illinois, have invented certain new and useful Improvements in Methods of Treating Radio-Active Barium Compounds, of which the following is a specification.

This invention relates to methods of treating barium compounds containing radio-active substances for the purpose of separating or concentrating the radio-active bodies therein.

I have discovered that radium hydroxid is more soluble in cold water, as well as in cold solutions of caustic alkalis, than is barium hydroxid and may, therefore, under proper conditions, be concentrated in solution by fractional recrystallization or fractional precipitation of the mixed hydroxids. This may be accomplished either by concentrating the solutions containing the mixed hydroxids, with proper cooling, in such manner as to secure a fractional recrystallization: or it may be accomplished by adding to the aqueous solution of the mixed hydroxids a precipitant for such hydroxids, preferably a strong solution of caustic soda or caustic potash. The radio-active substances mesothorium-one and thorium-X behave chemically like radium and may be concentrated in like manner.

It is well known that radium is very similar in its chemical properties to barium; and the best method heretofore known for effecting a separation of the two elements, or a concentration of the radium-content of the barium, depends upon a long series of fractional crystallizations of certain salts, notably the chlorids or bromids. When the mixed chlorids are fractionally crystallized from water, if one-half of the salt is permitted to crystallize out, it is found to contain about 65 per cent. of the radium, or, in other words, 1.3 per cent. of the radium for each one per cent. of the barium in the original chlorids. On the other hand, the concentration of the hydroxids by fractional crystallization, as hereinafter described according to method I, permits the separation of about 35 per cent. of the radium with five per cent. of the barium, or seven per cent. of the radium for each one per cent. of the barium; and method II, hereinafter described, involving the precipitation of the mixed hydroxids by addition of fixed alkali hydroxids, permits the separation of about 32 per cent. of the radium with two per cent. of the barium, or sixteen per cent. of the radium for each one per cent. of the barium. These methods are, therefore, from five to twelve times as effective as the fractional recrystallization of the chlorids.

Method I is as follows:—

(1) The barium chlorid or other soluble barium salt, containing radium, with or without other radio-active substances, as obtained by the treatment of radium-bearing minerals, is dissolved in water and the hot or cold solution is mixed with an excess of a solution of sodium hydroxid or other caustic alkali, the concentrations of the solutions being sufficient to cause the precipitation of the larger part of the barium as hydroxid when the solution is cold.

(2) The barium hydroxid crystals are then separated by filtration or otherwise from the solution, which contains most of the sodium chlorid formed, together with a small proportion of the barium. The barium which remains in solution is much richer in radium than that which is deposited in the form of crystals: for example, when five per cent. of the barium is left in the solution and 95 per cent. in the crystals, the solution contains approximately 35 per cent. of the radium, and the crystals approximately 65 per cent.

(3) The radium-bearing barium hydroxid crystals obtained according to (1) and (2) are now dissolved in hot or boiling water, in which they are very soluble, and the solution is cooled to normal temperature, or better to zero centigrade. A large part of the barium hydroxid crystallizes out, and again there occurs a great enrichment in radium of the barium remaining in the solution.

(4) The barium hydroxid crystals are again separated and dissolved in hot water, and the process above described is repeated as often as may be desired.

(5) The solutions containing the barium enriched in radium are further concentrated by the fractional crystallization of the hydroxids: for this purpose the barium and radium may be precipitated, for example as carbonates, separated from the liquid, re-dissolved as chlorids, and these chlorids converted into hydroxids and fractionally concentrated as above described. Or the enriched hydroxid solutions may be suitably concentrated by evaporation, and the barium hydroxid again allowed to crystallize from the cold concentrated solutions in essentially the manner described under (3). The concentration methods may of course be repeated as desired.

Instead of fractionally concentrating the dissolved hydroxids in the manner above described, the following procedure may be used:—

Method II: The barium chlorid or other soluble barium salt containing radio-active substances is treated as described under paragraphs 1, 2 and 3 of method I. To the resulting solutions containing barium hydroxid and containing also radium or other radio-active substances, presumably also as hydroxids, I add a sufficient amount of a strong solution of sodium hydroxid or potassium hydroxid (for example a thirty per cent. solution of sodium hydroxid) to cause the precipitation of the larger part of the barium hydroxid still remaining in the solution. By this means a larger proportion of the barium than of the radium is precipitated, so that the remaining solution is now much richer in radium than before the treatment with the sodium or potassium hydroxid solution.

An illustrative example of the practice of the above-described method is as follows:— 41 grams of barium chlorid containing 118 units (arbitrary) of mesothorium-one were dissolved in 180 cc. of water, and treated with 75 cc. of a thirty per cent. solution of caustic soda free from carbonate, this corresponding approximately to a fifty per cent. excess of caustic soda. The solution was cooled to zero degrees centigrade and the crystals of barium hydroxid filtered out. The filtrate yielded 1.53 grams of $BaCl_2.2H_2O$. The crystals were dissolved in 180 cc. of hot water, cooled to zero, and 20 cc. of thirty per cent. caustic soda was added. The mixture was permitted to stand at zero degrees centigrade for fifteen minutes, and was then filtered. The process was repeated until a total of six filtrates had been obtained. The amount of barium and also of mesothorium-one in each filtrate, as well as in the residual barium hydroxid crystals, was accurately determined with the following results:—

| No. of filtrate. | Weight of $BaCl_2.2H_2O$ in each filtrate. | Arbitrary units of mesothorium-one in each filtrate. |
| --- | --- | --- |
| | Grams. | |
| 1 | 1.53 | 22. |
| 2 | 1.10 | 13.2 |
| 3 | .84 | 8.8 |
| 4 | .67 | 7.0 |
| 5 | .84 | 4.6 |
| 6 | .53 | 2.3 |

The residue of barium hydroxid crystals was found to contain 88 per cent. of the original barium and six per cent. of the original mesothorium-one.

By the above-described methods, I have concentrated radium, mesothorium-one and thorium-X, singly and also collectively, from mixtures containing much barium, with rapidity and ease.

It is desirable that the method be carried out with exclusion of air, on account of the tendency to the formation of barium carbonate by the action of the carbon dioxid of the air; but this is not regarded as essential to the invention.

I claim:—

1. The method of separating and concentrating radio-active substances, such as radium, mesothorium-one and thorium-X, from barium compounds, which comprises converting the barium compounds and radio-active substances into hydroxids, and fractionally separating the barium hydroxid from the solution.

2. In a method of separating and concentrating radio-active substances, such as radium, mesothorium-one and thorium-X, from barium compounds, the step which consists in partially precipitating the hydroxids of barium and the radio-active substances from solution.

3. In a method of separating and concentrating radio-active substances, such as radium, mesothorium-one and thorium-X, from barium compounds, the step which consists in partially precipitating the hydroxids of barium and the radio-active substances from solution by the addition of alkali-metal hydroxids.

In testimony whereof I affix my signature in presence of two witnesses.

HERBERT N. McCOY.

Witnesses:
OTTO N. BERNDT,
VORIES G. McCOY.